(12) United States Patent
Warfield et al.

(10) Patent No.: US 7,745,722 B2
(45) Date of Patent: Jun. 29, 2010

(54) SYSTEM FOR MOUNTING A SOLAR MODULE ON A ROOF OR THE LIKE AND METHOD OF INSTALLING

(75) Inventors: Donald B. Warfield, Woodbine, MD (US); Paul L. Garvison, Frederick, MD (US)

(73) Assignee: BP Corporation North America Inc., Warrenville, IL (US)

( * ) Notice: Subject to any disclaimer, the term of this patent is extended or adjusted under 35 U.S.C. 154(b) by 864 days.

(21) Appl. No.: 11/533,990

(22) Filed: Sep. 21, 2006

(65) Prior Publication Data

US 2007/0079865 A1    Apr. 12, 2007

Related U.S. Application Data

(60) Provisional application No. 60/724,241, filed on Oct. 6, 2005.

(51) Int. Cl.
*E04C 1/42* (2006.01)
*H01L 25/00* (2006.01)

(52) U.S. Cl. .................. 136/244; 136/243; 136/245; 136/251; 52/173.3

(58) Field of Classification Search ............... 136/243, 136/244, 245, 251; 52/173.1, 173.3, 745.21, 52/746.11, 36.5
See application file for complete search history.

(56) References Cited

U.S. PATENT DOCUMENTS

| 5,647,915 A | 7/1997 | Zukerman |
| 6,672,018 B2 * | 1/2004 | Shingleton .................. 52/173.3 |
| 2005/0166383 A1 * | 8/2005 | Newberry ..................... 29/428 |

FOREIGN PATENT DOCUMENTS

| JP | 09 184249 | 7/1997 |
| WO | WO 01/42063 | * 6/2001 |

* cited by examiner

*Primary Examiner*—Jennifer K Michener
*Assistant Examiner*—Jayne Mershon
(74) *Attorney, Agent, or Firm*—Thomas E. Nemo

(57) ABSTRACT

A system and method for installing a solar module on a roof using a mounting structure which can be adjusted after it has been fixed to the roof. The mounting structure is comprised of a plate having a slot into which an adjustable bracket is slidably positioned. The mounting structures are spaced from each other and the plates are fixed to the roof by toggle bolts or the like. A framed module is placed across the structures and one or both of the adjustable brackets are adjusted to align holes in the frame of the module with threaded chambers in the brackets. Next, threaded fasteners are passed through the holes and into the chambers to thereby secure the solar module to the roof.

12 Claims, 3 Drawing Sheets

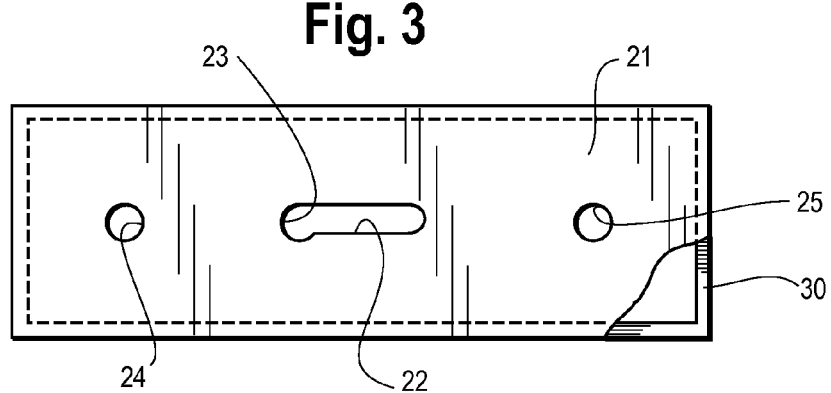
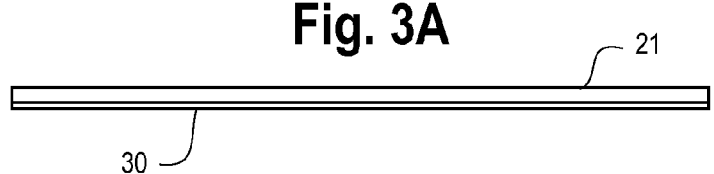
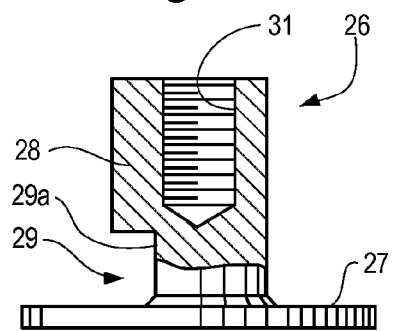
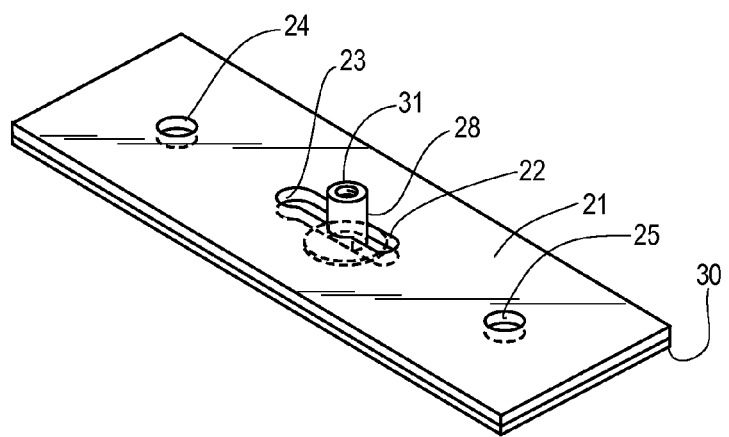

SYSTEM FOR MOUNTING A SOLAR MODULE ON A ROOF OR THE LIKE AND METHOD OF INSTALLING

This application claims benefit of U.S. Provisional Patent Application Ser. No. 60/724,241, filed on Oct. 6, 2005.

FIELD OF THE INVENTION

The present invention relates to mounting a solar module on a support surface and in one of its aspects relates to a system and an installation method using adjustable mounts for installing solar modules onto a support surface such as a roof of a building.

BACKGROUND OF THE INVENTION

In recent years, considerable advances have been made in using photovoltaic cells or the like to directly convert solar energy into useful electrical energy. Typically, a plurality of photovoltaic cells are encased between a transparent cover sheet (e.g. glass, plastic, etc.) and a backsheet, to form flat, rectangular-shaped modules (sometimes also called "laminates") of a manageable size (e.g. 2½'×5'). These modules are then shipped to a site where they are assembled into an array onto the roof of a building or the like where the array will be exposed to the sun.

While some modules are "unframed", recently the trend has been towards providing frames around the peripheries of the modules to thereby increase the stability of the modules and to provide a positive means for installing the modules onto roofs or the like. Also for both structural and esthetic considerations, it is usually preferable to construct the frames of adjacent modules so that they overlap to conceal the necessary electrical wiring and provide a pleasing appearance on a roof. For a good, detailed description of the construction and operation of such solar modules, see U.S. Pat. Nos. 6,111,189 and 6,465,724 B1.

Typically, framed modules are bolted or clamped onto separate support structures, e.g. "stand-offs", which, in turn, are securely bolted or screwed directly into the roof. The spots on the roof to which these support structures can be securely attached for a long life are effectively limited to those which are adequately supported by a framing member (e.g. a rafter) or roofing material strong enough to properly receive and retain the lag screws over the operational life of the array. This can create problems where the roof is shingled over slats or where the decking material is comprised of thin plywood, chipboard, or the like.

While framed modules have experienced commercial success, the installation of these modules can be relatively tedious and time consuming. That is, the task of (a) aligning two, relatively bulky and weighty modules, aligning the respective openings in adjacent frames, and (b) holding them in position while threading a lag screw or the like through the aligned openings and into the roof can present a difficult, and sometime frustrating task for a single installer.

Also, there is nothing to insure that once the openings in the adjacent frames are aligned that the frames will not shift slightly so that when, for example, a lag screw is threaded through the openings and into the roof, the screw will penetrate the roof at the precise point necessary to keep the modules parallel to each other. Any slight shift of the frames can result in a less that desirable appearance since some of the modules will be skewed in relation to the others.

Since esthetics are important, especially when the array of modules is highly visible, if skewing occurs, certain lag screws may have to be repositioned to properly align the modules to give the desired appearance. This can leaves holes in the roof which have to be sealed to prevent leaks. Further, the roofing material around the lag screws, themselves, should be sealed to prevent possible leaks. This may be difficult to do after the modules have been mounted since the accessibility to the screws is limited.

Since the total cost of any solar array includes its installation costs, any savings in time and man power needed in mounting the array become vital considerations in the overall economics of such an array. In view of the above, it can readily be seen that any savings in these costs can significantly make the use of solar arrays more competitive in the market place.

SUMMARY OF THE INVENTION

The present invention provides a system and method for installing a solar array on a support surface such as a root of a building or the like. The system uses a mounting structure which can be adjusted after it has been fixed to the roof to compensate for minor misplacements or misalignments between the modules and the mounting structure. Further, the adjustable mounting structure allows for any slight variations between the dimensions (e.g. width) of the individual modules being installed. Still further, the ability to adjust the mounting structure during installation allow the mounting structures to be fixed on a particular roof at more appropriate locations in order to deal with the pre-existing structural considerations, (e.g. placement of framing members, roofing nails, etc.) which otherwise could cause problems in the installation of the modules.

More specifically, the adjustable mounting structure of the present invention is comprised of a plate adapted to be secured to said support surface (e.g. roof). The plate has a slot through a portion of its length. An adjustable bracket includes an upstanding, preferably cylindrical portion which, in turn, extends upward through the slot whereby the bracket is free to slide within the slot. The bracket includes a flange at the lower end of the upstanding portion to prevent the bracket from passing completely through the slot. A threaded chamber is formed in the upstanding portion of the bracket and is adapted to receive a fastener for securing a solar module to said mounting structure.

The plate has a hole near each end of the plate through which an appropriate fastener (e.g. toggle bolt) secures the plate to the roof. Preferably, a "gasket" of sealant is provided around the perimeter of said plate to seal between the plate and the roofing material as the plate is bolted down. Of course, the sealant can be applied manually after the plate is fixed, if desired.

In one method of installing an array of solar modules on a support structure such as a roof in accordance with this invention, at least two mounting structures are affixed to the roof for each solar module to be installed although some mounting structures may be common to two adjacent modules as will become obvious below. The mounting structures are spaced from each other at a distance equal to approximately the length of one side (e.g. width) of a solar module. Each module is encased in a frame which has holes in its opposing sides which align respectively with threaded chambers in the adjustable brackets of the mounting structures when the module is properly positioned and the brackets are adjusted.

Once a module is positioned across the fixed, mounting structures, one or both of the brackets in the respective mounting structures are adjusted to align the holes in the frame with the threaded chambers in the brackets. Threaded fasteners are then passed through the aligned holes and are threaded into the respective chambers to thereby secure the solar module to said support surface. This procedure is repeated until all of the solar modules have been installed.

BRIEF DESCRIPTION OF THE DRAWINGS

The actual construction operation and apparent advantages of the present invention will be better understood by referring to the drawings, not necessarily to scale, in which like numerals identify like parts and in which:

FIG. 3 is a top view of an embodiment of the plate element of the mounting structure of the present invention;

FIG. 3A is a side view of FIG. 3;

FIG. 4 is an enlarged side view, partly in section, of the adjustable bracket of the mounting structure of the present invention;

FIG. 5 is a perspective view of the present mounting structure in its assembled position;

While the invention will be described in connection with its preferred embodiments, it will be understood that this invention is not limited thereto. On the contrary, the invention is intended to cover all alternatives, modifications, and equivalents that may be included within the spirit and scope of the invention, as defined by the appended claims.

DETAILED DESCRIPTION OF THE INVENTION

Figure 1:
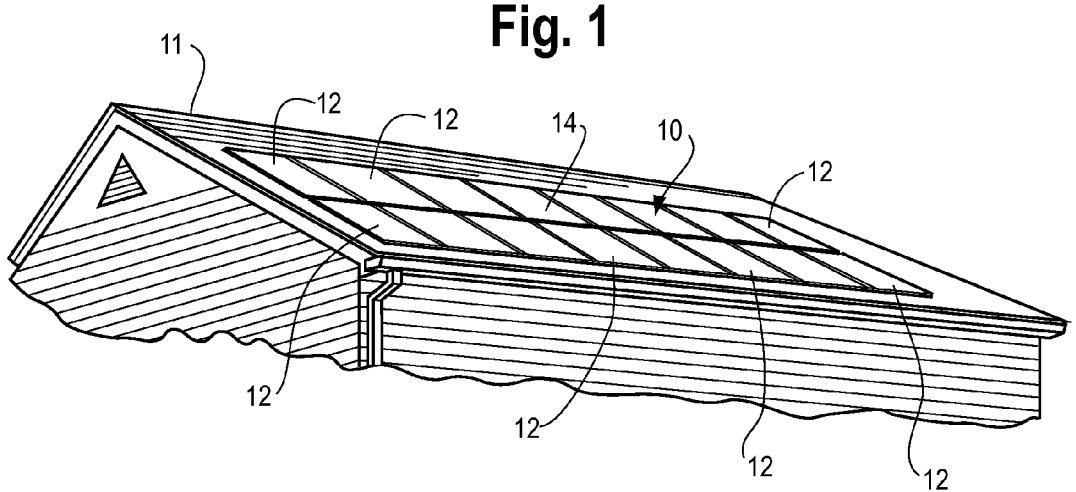
FIG. 1 is a perspective view of an array of solar modules installed onto a support surface (e.g. roof) in accordance with an embodiment the present invention.

Referring now to the drawings, FIG. 1 illustrates a typical solar array 10 which has been mounted on a support surface (e.g. roof 11 of a house or the like) in accordance with the present invention. Array 10 is comprised of a plurality (sixteen shown) of solar modules 12 (only some numbered), which have been positioned on and secured to mounting structures 20 (hidden and not shown in FIG. 1 but which will be discussed in full detail below). As will be fully understood in the art, a typical solar module 12 is typically formed by positioning a plurality of photovoltaic (PV) cells 13 (FIG. 2) between a sheet of a transparent material 14 (e.g. glass, plastic, etc.) and another sheet of material (not shown), whereby the finished module 12 is effectively a flat, rectangular, plate-like structure as shown in the figures.

Figure 2:
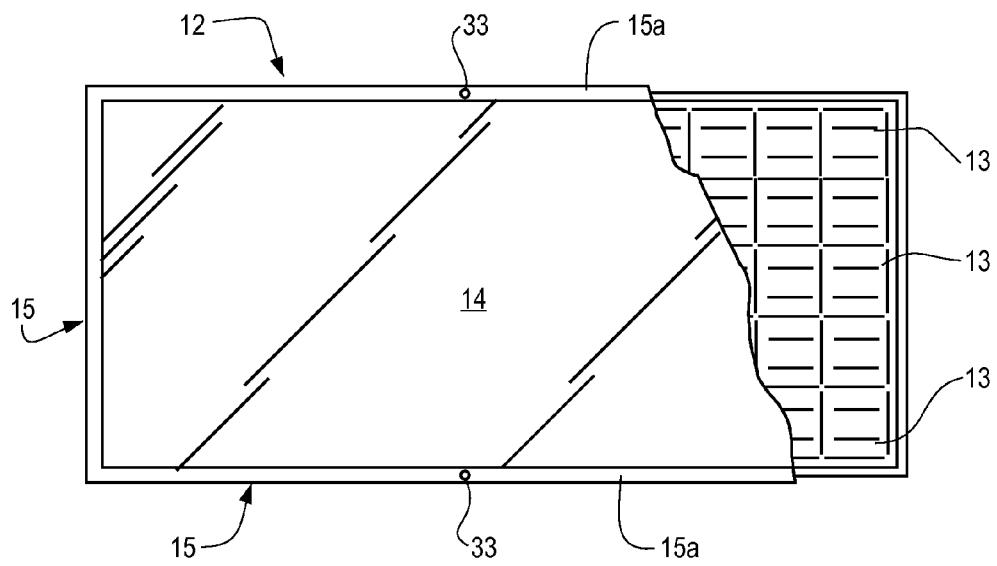
FIG. 2 is a top view of a typical framed, solar module of the type shown in FIG. 1 having a portion of its top surface broken away to show the individual PV cells.
Figure 7:
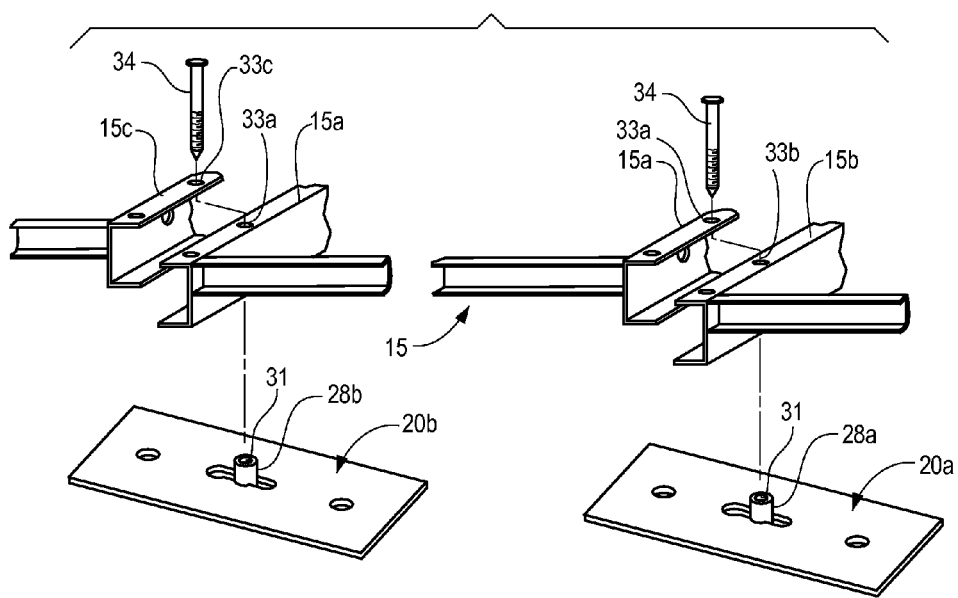
FIG. 7 is an enlarged, exploded view, partly broken away of the frames of adjacent solar modules as they will be mounted onto the mounting structures of the present invention.

To complete the assembly of module 12, the sandwich of PV cells 13 is typically encased within a frame 15 (FIGS. 2 and 7). Frame 15 not only adds stability and protection to the module but is also useful in the installation of the modules as will become evident below. Preferably, the opposing, longitudinal sides 15a of frame 15 are constructed so that sides 15a of adjacent modules 12 will overlap each other when installed as will be further explained below. For a fully disclosure of a typical solar module constructed in this manner, see U.S. Pat. No. 6,111,189 and U.S. Pat. No. 6,465,724 B1, both of which are incorporated by reference herein in their entireties.

In accordance with an embodiment of the present invention, a new mounting structure 20 is used for installing the array 10 of solar modules 12 onto roof 11. Referring now to FIGS. 3-5, mounting structure 20 is comprised of a plate 21 having a slot 22 running along and through a portion of the longitudinal center line of the plate. Slot 22 has an enlarged circular opening 23 at one end for a purpose explained below. Holes 24, 25 are provided through plate 21 at either end of slot 22 which are adapted to receive fasteners 32 (FIG. 6) or the like for securing plate 21 in position on roof 11.

An adjustable element or bracket 26, shown enlarged in FIG. 4, is comprised of a base or flange 27 and an upwardly extending, preferably cylindrical upstanding portion 28 which, in turn, has a reduced area about a part of its circumference near its lower end to form a recessed area 29 for a purpose described below. Upstanding portion 28 also has an internal threaded chamber 31 best shown in FIG. 4. To assemble mounting structure 20, the upstanding portion 28 is inserted into enlarged opening 23 of slot 22 and is rotated, if needed, until the inner wall 29a of recessed area 29 aligns with one side of slot 22. The reduced "diameter" of the recessed area 29 allows bracket 26 to slide along slot 22 while the flatten wall 29a of recessed area 29 prevents the bracket from rotating when a fastener is screwed into chamber 31 of the bracket. Flange 27 prevents bracket 26 from being pulled out of slot 22 through the top of plate 21.

Further, since most fasteners (e.g. toggle bolts, screws, or the like) used to fix plate 21 in place will likely penetrate the roofing material, preferably a "gasket" 30 (e.g. a 3/16 inch thick layer of a sealant such as butyl sealant or the like) is provided around the perimeter of plate 21 which will effect a seal as plate 21 is bolted or otherwise fastened down onto the roof. In some instances, the perimeter of plate 21 may be manually sealed after the plate is affixed in position in lieu of gasket 30.

Figure 6:
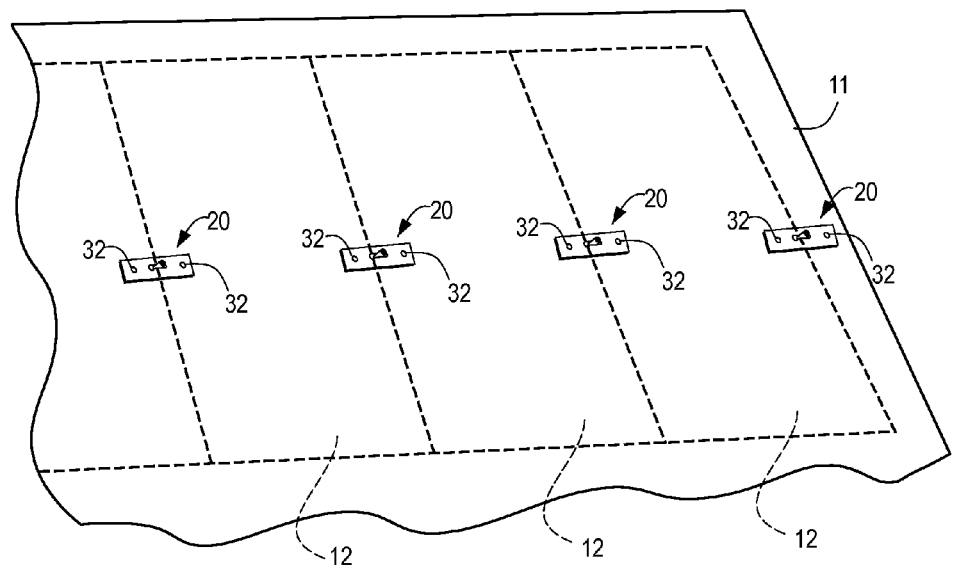
FIG. 6 is a simplified view of the mounting structures of the present invention in place on a roof surface with cooperating solar modules being shown in dotted lines.

In accordance with the present invention, the mounting structures 20 required for installing array 10 are assembled as described above and are attached in their respective, predetermined positions on the support surface, e.g. roof 11 (FIG. 6). Appropriate fasteners 32 (FIG. 6 only) are passed through openings 24, 25 in plate 21 to firmly affix the mounting structures to the roof. Toggles bolts, well known in the art, are the preferred fasteners 32 since they have a much higher resistance to "pull-out" than do lag bolts or screws. This can be a real consideration where the structures 20 are going to be installed on decking made of plywood or OSB (oriented strand board, commonly known as "chipboard") or other low "pull-out" resistant materials.

Typically, the mounting structure 20 will be spaced from each other at distances which equal approximately the widths of the modules 12 as shown in the Figures or the lengths of the modules if otherwise oriented. While only one mounting structure 20 is shown to secure each side of adjacent modules 12, it should be recognized that more than one (e.g. one at each corner or more) can be used depending on a particular situation without departing from the present invention. As the plate 21 is moved downward and is secured by its respective fastener 32 (FIG. 6) (e.g. toggles bolts), gasket 30 is compressed to seal around plate 21.

FIG. 7 clearly illustrates a major advantage of being able to adjust mounting structures of the present invention when installing a solar array on a roof or the like. Once plates 21 are secured to the roof, the bracket 26 in a first mounting means (not shown in FIG. 7) is adjusted to align a hole in the frame of a first module with the chamber in the bracket of a first mounting structure (not shown in FIG. 7). A threaded fastener then secures that side of the module to its mounting structure.

The hole 33b in the other side 15b of module frame 15b of the first module (only the frame members shown in FIG. 7) is then aligned with the hole 33a on one side 15a of a second module and bracket 28a of a second mounting structure 20a is adjusted to align chamber 31 with aligned holes 33a, 33b. A threaded fastener 34 then secures the common sides 15a, 15b of the adjacent modules to mounting structure 20a. This process is repeated with the other side 15a of the second module and the side 15c of a third module. Holes 33a, 33c are aligned and bracket 28b is adjusted so that fastener 34 can now secure the module to the mounting structure 20b. This process is repeated until all of the modules have been installed.

By being adjustable, mounting structures 20 has the ability to accommodate for minor misplacements or misalignments of the modules during installation. Also, mounting structures 20 allow for minor module dimension variations which are not all that uncommon in the real world. Still further, the ability to move bracket 26 slightly during installation allow the placement of the mounting structures at spots on a particular roof necessary to deal with framing members, roofing nails, etc. which are already present from the prior construction of the roof.

U.S. Provisional Patent Application Ser. No. 60/724,241, filed on Oct. 6, 2005, is hereby incorporated by reference in its entirety.

What is claimed is:

1. A solar array comprising:
   at least two separate mounting structures each separate mounting structure comprising:
      a plate adapted to be secured to a support surface, said plate having a top side, a bottom side, and a slot therein; and
      a bracket positioned in said slot in said plate and able to slide within the slot, allowing adjustment of the bracket;
   at least one solar module, which comprises a frame; and
   means for securing said frame of said at least one solar module to said bracket;
   wherein a length and a width of said plate are each less than a width of said at least one solar module; and
   the said at least two separate mounting structures, when secured to a support surface, are spaced from each other at a distance approximately equal to one side of the at least one solar module whereby said at least one solar module spans said distance between said at least two separate mounting structures.

2. The solar array of claim 1 wherein said bracket comprises:
   a flange; and
   an upstanding portion affixed to said flange and extending upward through said slot, said upstanding portion having an internal threaded chamber formed therein.

3. The solar array of claim 2 wherein said frame of said at least one solar module having sides which encase said at least one solar module; each of two opposing sides of said frame of said at least one solar module having a hole therein which is aligned with said threaded chamber in a respective said bracket when said at least one solar module spans said distance between said at least two separate mounting structures; and
   threaded fasteners positioned through said respective hole in said frame and threaded into said respective threaded chamber to thereby secure said at least one solar module to said at least two separate mounting structures.

4. The solar array of claim 3 including:
   sealant substantially surrounding the perimeter of each of said at least two plates.

5. The solar array of claim 4 further comprising:
   a plurality of solar modules; and
   a plurality of mounting structures, at least two mounting structures of said plurality of mounting structures are spaced from each other to secure each solar module of said plurality of solar modules to said support surface.

6. The solar array of claim 5 wherein said support surface is a roof of a building, and adjacent modules of said plurality of solar modules overlap when installed.

7. A method of installing an array of solar modules, said method comprising:
   providing at least two separate mounting structures, wherein the said at least two separate mounting structures comprise:
   a plate adapted to be secured to a support surface, said plate having a top side, a bottom side, and a slot therein; and
   a bracket positioned in said slot in said plate and able to slide within the slot, allowing adjustment of the bracket, said bracket having means for receiving a fastener for securing a solar module to said at least two separate mounting structures;
   the said plate having a length and width, each of a dimension less than a width of said solar module;
   the said solar module having a frame;
   securing said at least two separate mounting structures on a support surface and spaced from each other at a distance equal to approximately a length of one side of the said solar module;
   positioning the said solar module across said at least two separate mounting structures;
   adjusting said bracket in one or both of said at least two separate mounting structures after said at least two separate mounting structures are secured to said support surface, thereby aligning holes in opposing sides of said solar module to said bracket of said at least two separate mounting structures; and
   passing fasteners through said holes in said solar module and into said respective mounting means of said brackets to thereby secure said solar module to said support surface.

8. The method of claim 7 wherein said holes in said solar module are formed in the sides of said frame that encases said solar module.

9. The method of claim 8 wherein said bracket comprises:
   a flange; and
   an upstanding portion affixed to said flange and extending upward through said slot;
   wherein said means for receiving said fasteners comprises a threaded chamber formed internally within said upstanding portion of said bracket.

10. The method of claim 9 wherein said plate of said at least two separate mounting structures is secured to said support surface by toggle bolts.

11. The method of claim 10 including: sealing said plates of said mounting structures to the support surface.

12. The method of claim 10 wherein said support surface is a roof of a building, and adjacent modules overlap when installed.

* * * * *